(12) United States Patent
Belwafa et al.

(10) Patent No.: US 10,407,015 B2
(45) Date of Patent: Sep. 10, 2019

(54) RESTRAINT SYSTEM

(71) Applicant: Ford Global Technologies, LLC, Dearborn, MI (US)

(72) Inventors: Jamel E. Belwafa, Ann Arbor, MI (US); Mohammad Omar Faruque, Ann Arbor, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 67 days.

(21) Appl. No.: 15/634,038

(22) Filed: Jun. 27, 2017

(65) Prior Publication Data

US 2018/0370472 A1    Dec. 27, 2018

(51) Int. Cl.
| | |
|---|---|
| B60R 21/207 | (2006.01) |
| B60R 21/203 | (2006.01) |
| B60R 21/205 | (2011.01) |
| B60R 21/231 | (2011.01) |
| B60R 21/0136 | (2006.01) |
| B60R 21/00 | (2006.01) |
| B60R 21/01 | (2006.01) |

(52) U.S. Cl.
CPC ........ B60R 21/0136 (2013.01); B60R 21/203 (2013.01); B60R 21/205 (2013.01); B60R 21/207 (2013.01); B60R 21/231 (2013.01); B60R 21/23138 (2013.01); B60R 2021/0006 (2013.01); B60R 2021/0009 (2013.01); B60R 2021/01013 (2013.01); B60R 2021/01034 (2013.01); B60R 2021/23107 (2013.01); B60R 2021/23161 (2013.01)

(58) Field of Classification Search
CPC ................................................. B60R 21/207
See application file for complete search history.

(56) References Cited

U.S. PATENT DOCUMENTS

| | | | |
|---|---|---|---|
| 5,251,931 A | 10/1993 | Semchena et al. | |
| 5,564,736 A | 10/1996 | Kim | |
| 5,575,497 A * | 11/1996 | Suyama | ................ B60R 21/231 280/730.1 |
| 7,549,672 B2 | 6/2009 | Sato et al. | |

(Continued)

FOREIGN PATENT DOCUMENTS

| | | |
|---|---|---|
| CN | 205997843 U | 3/2017 |
| JP | 2013124063 A | 6/2013 |

OTHER PUBLICATIONS

Heudorfer et al., "Protection System for Far-Side Occupants in Lateral Crashes", Takata-Petri AG, Germany, Paper No. 09-0295, 2009.

(Continued)

*Primary Examiner* — Faye M Fleming
(74) *Attorney, Agent, or Firm* — Frank A. MacKenzie; Bejin Bieneman PLC

(57) ABSTRACT

A restraint system includes a seat and a seat airbag supported by the seat and inflatable to an inflated position. The restraint system includes an instrument panel and a forward airbag supported by the instrument panel and inflatable to an inflated position. When the seat airbag is in the inflated position and the forward airbag is in the inflated position, the seat airbag extends from the seat to the forward airbag.

20 Claims, 9 Drawing Sheets

(56) References Cited

U.S. PATENT DOCUMENTS

| | | |
|---|---|---|
| 7,717,459 B2 * | 5/2010 | Bostrom ............ B60R 21/23138 |
| | | 280/730.1 |
| 7,802,809 B2 | 9/2010 | Ryan et al. |
| 8,684,408 B2 | 4/2014 | Thomas et al. |
| 8,882,138 B1 | 11/2014 | Hicken et al. |
| 9,056,592 B1 | 6/2015 | Kline |
| 9,233,661 B2 * | 1/2016 | Yamanaka ............... B60R 21/18 |
| 9,358,943 B2 | 6/2016 | Borjeson et al. |
| 9,463,763 B2 | 10/2016 | Watamori et al. |
| 9,493,135 B2 | 11/2016 | Fukawatase |
| 9,566,882 B2 | 2/2017 | Mihm et al. |
| 9,598,042 B2 | 3/2017 | Schneider |
| 9,650,011 B1 | 5/2017 | Belwafa |
| 9,925,949 B2 | 3/2018 | Mihm |
| 9,981,624 B2 * | 5/2018 | Perlo ................. B60R 21/23138 |
| 9,994,181 B1 | 6/2018 | Dubaisi et al. |
| 2008/0106128 A1 | 5/2008 | Kashiwagi |
| 2015/0375706 A1 | 12/2015 | Jaradi et al. |
| 2016/0039385 A1 | 2/2016 | Watamori et al. |
| 2016/0082915 A1 | 3/2016 | Madaras |
| 2016/0325707 A1 | 11/2016 | Morozini de Lira |
| 2017/0072893 A1 | 3/2017 | Fujiwara |

OTHER PUBLICATIONS

Non-Final Office Action dated Sep. 28, 2018 re U.S. Appl. No. 15/656,106 filed Jul. 21, 2017.
GB Search and Examination Report dated Dec. 14, 2018 re GB Appl. No. 1810461.2.

* cited by examiner

RESTRAINT SYSTEM

BACKGROUND

An interior of a vehicle, such as automobile, may include various safety devices for absorbing energy from an occupant of the vehicle during an impact of the vehicle. For example, the vehicle may include an airbag affixed in a steering wheel or an instrument panel. The airbag may be configured to absorb energy and soften impact between the body of the occupant and the steering wheel or the instrument panel.

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact, the occupant may move forward and laterally, and a seat belt may impart a load onto a chest of the occupant.

Several types of information are measured during the oblique crash test, including airbag performance, test dummy reaction, etc. One type of measurement is the Brain Injury Criteria (BrIC) values during the oblique impact. The BrIC values characterize occupant movement such as angular velocities of the head. Occupants may move toward a vehicle pillar, e.g., an A-pillar, or toward the center of an instrument panel. There remains an opportunity to design an energy absorber to slow occupant movement in various frontal crashes, including oblique impacts.

DETAILED DESCRIPTION

Figure 1:
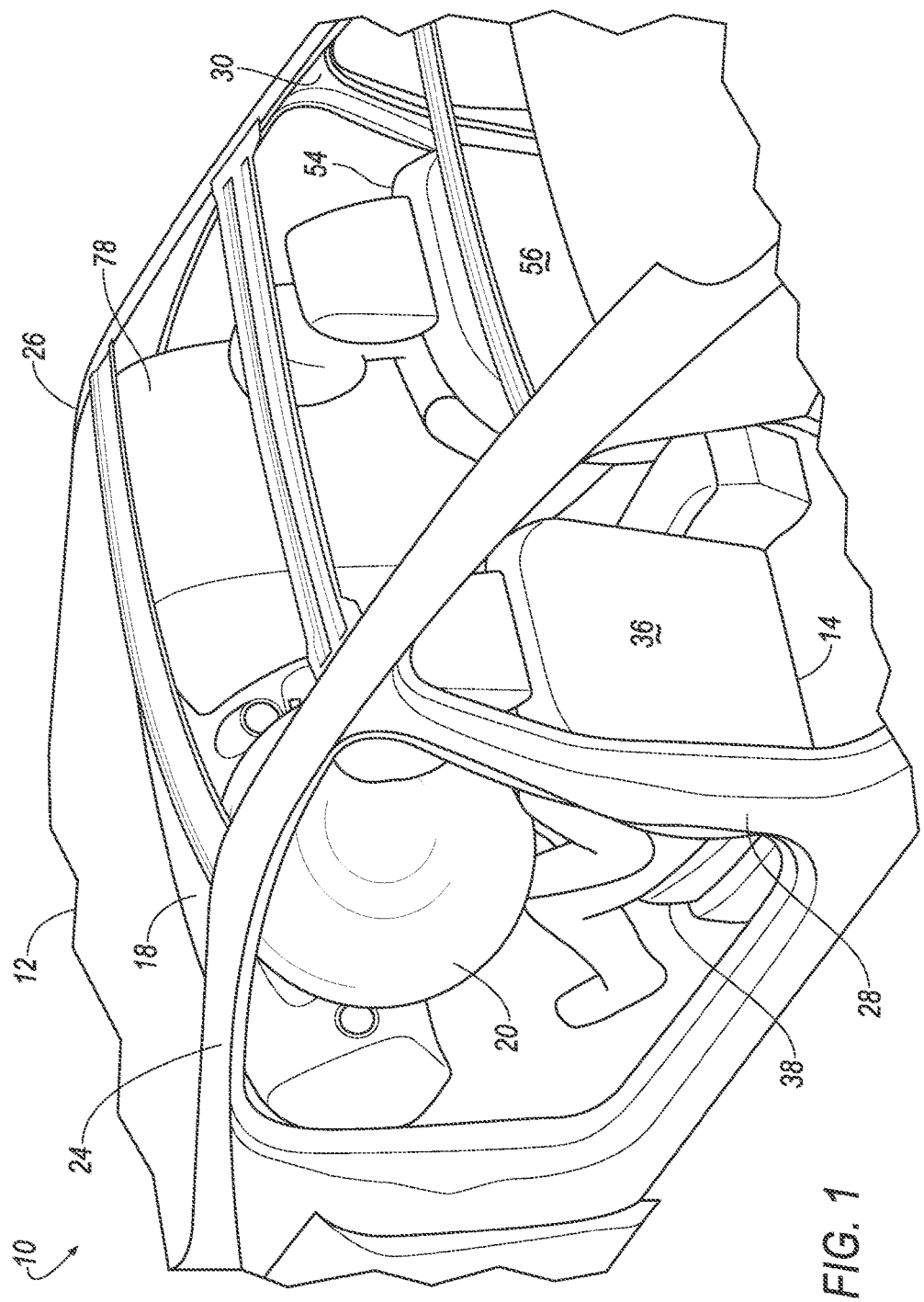
FIG. 1 is a perspective view of a portion of a vehicle including a restraint system.

A restraint system includes a seat, a seat airbag, an instrument panel, and a forward airbag. The seat airbag is supported by the seat and inflatable to an inflated position. The forward airbag is supported by the instrument panel and inflatable to an inflated position. When the seat airbag is in the inflated position and the forward airbag is in the inflated position, the seat airbag extends from the seat to the forward airbag.

The restraint system may further include a steering wheel and a second forward airbag supported by the steering wheel and inflatable to an inflated position. When the seat airbag, the forward airbag, and the second forward airbag are each in the inflated position, the forward airbag and the second forward airbag may define a gap and the seat airbag may be disposed in the gap.

The restraint system may further include a vehicle door and a second seat airbag supported by the seat and inflatable to an inflated position. When the second seat airbag and the forward airbag are each in the inflated position, the second seat airbag may be disposed between the forward airbag and the vehicle door. The restraint system may further include an impact sensor programmed to detect a side impact and an actuator programmed to inflate the second seat airbag upon detecting the side impact.

The restraint system may further include an impact sensor programmed to detect an impact direction and an actuator programmed to inflate the seat airbag based on the detected impact direction.

The restraint system may further include a second seat including a second seat airbag supported by the second seat and inflatable to an inflated position. When the seat airbag is in the inflated position and the forward airbag is in the inflated position, the second airbag may extend from the second seat to the forward airbag.

A restraint system includes an impact sensor programmed to detect an impact direction, a seat, a first airbag supported by the seat and inflatable to an inflated position, a second airbag supported by the seat and inflatable to an inflated position, and an actuator in communication with the first airbag and the second airbag. Based on the impact direction, the actuator is programmed to selectively inflate one of the first airbag and the second airbag.

In the restraint system, the seat may include a first side and an opposing second side. The first airbag may be disposed in the first side and the second airbag may be disposed in the second side.

The restraint system may further include an impact sensor programmed to detect a side impact. Upon detecting the side impact, the actuator may be programmed to actuate one of the first airbag and the second airbag.

In the restraint system, the impact direction may be one of a left oblique impact direction and a right oblique impact direction, and the actuator may be programmed to inflate the first airbag when the impact direction is the left oblique impact direction and to inflate the second airbag when the impact direction is the right oblique impact direction.

The restraint system may further include a second seat including a third airbag supported by the second seat inflatable to an inflated position and a fourth airbag supported by the second seat inflatable to an inflated position. Based on the impact direction, the actuator may be programmed to inflate one of the third airbag and the fourth airbag. The impact direction may be one of a left oblique impact direction and a right oblique impact direction. The actuator may be programmed to inflate one of the first airbag and the second airbag and one of the third airbag and the fourth airbag when the impact direction is the left oblique impact direction and to inflate the other of the first airbag and the second airbag and the other of the third airbag and the fourth airbag when the impact direction is the right oblique impact direction.

A vehicle includes a pillar, an instrument panel, a seat, a forward airbag, a first seat airbag, and a second seat airbag. The forward airbag is supported by the instrument panel and inflatable to an inflated position. The first seat airbag is supported by the seat and inflatable to an inflated position. The second seat airbag is supported by the seat and inflatable to an inflated position. When the forward airbag and the first seat airbag are each in the inflated position, the first seat airbag extends from the seat to the forward airbag. When the forward airbag and the second seat airbag are each in the inflated position, the second seat airbag is disposed between the forward airbag and the pillar.

The vehicle may further include an actuator programmed to inflate the first seat airbag and the second seat airbag. The vehicle may further include an impact sensor programmed to detect an impact direction. The actuator may be further programmed to inflate one of the first seat airbag and the second seat airbag and to prevent inflation of the other of the first seat airbag and the second seat airbag based on the detected impact direction.

The vehicle may further include a second pillar, a second seat, a third seat airbag, a fourth seat airbag, a steering wheel, and a second forward airbag. The third seat airbag may be inflatable to an inflated position and may be supported by the second seat. The fourth seat airbag may be inflatable to an inflated position and may be supported by the second seat. The second forward airbag may be supported by the steering wheel and may be inflatable to an inflated position. When the second forward airbag and the third seat airbag are each in the inflated position, the third seat airbag may be engaged with the second forward airbag. When the second forward airbag and the fourth seat airbag are each in the inflated position, the fourth seat airbag may be disposed between the second forward airbag and the second pillar.

The vehicle may further include an impact sensor programmed to detect an impact direction and an actuator programmed to inflate at least one of the first seat airbag, the second seat airbag, the third seat airbag, and the fourth seat airbag based on the detected impact direction.

The impact direction may be one of a left oblique impact direction and a right oblique impact direction. The actuator may be further programmed to inflate the first seat airbag and the fourth seat airbag when the detected impact direction is the left oblique impact direction.

The impact direction may be one of a left oblique impact direction and a right oblique impact direction. The actuator may be further programmed to inflate the second seat airbag and the third seat airbag when the detected impact direction is the right oblique impact direction.

The adjectives "first," "second," "third," and "fourth" are used throughout this document are not intended to signify importance or order. For example, in a plurality, the terms "first" and "second" may refer to any two of the plurality.

With reference to the Figures, wherein like numerals indicate like parts throughout the several views, a restraint system 10 in a vehicle 12 includes a seat 14, a seat airbag 16 supported by the seat 14 and inflatable to an inflated position, an instrument panel 18, and a forward airbag 20 supported by the instrument panel 18 and inflatable to an inflated position. When the seat airbag 16 is in the inflated position and the forward airbag 20 is in the inflated position, the seat airbag 16 extends from the seat 14 to the forward airbag 20.

When the seat airbag 16 extends to the forward airbag 20, the seat airbag 16 may receive an occupant during an oblique vehicle impact. As the occupant moves toward the direction of the impact, the seat airbag 16 may absorb energy from the occupant. Furthermore, based on the direction of the impact, the seat airbag 16 may selectively inflate to absorb impact energy from the occupant.

The vehicle 12 may be any suitable type of vehicle 12, e.g., an automobile, including a sedan, a pick-up truck, a sport-utility vehicle, etc. The vehicle 12 may be an autonomous vehicle 12. For example, the vehicle 12 may have a computer that may control the operations of the vehicle in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

As shown in FIGS. 1-8, the vehicle 12 includes a body 22. The body 22 includes a forward pillar 24, a second forward pillar 26, a central pillar 28, and a second central pillar 30. As shown in the Figures, the body 22 may have a unibody construction, i.e., a unitary-body construction. In the unibody construction, the body 22 is unitary, i.e., a continuous one-piece unit. As another example not shown in the Figures, the body 22 and a frame (not shown) of the vehicle may have a body-on-frame construction (also referred to as a cab-on-frame construction). In other words, the body 22 and frame are separate components, i.e., are modular, and the body 22 is supported on and affixed to the frame. Alternatively, the body 22 and frame may have any suitable construction. The body 22 and/or the frame may be formed of any suitable material, for example, steel, aluminum, etc.

As shown in FIGS. 2-8, the body 22 of the vehicle includes a door 32 and a second door 34. The door 32 and the second door 34 are shown in the Figures as front doors.

As shown in FIGS. 1-8, the restraint system 10 includes the seat 14. The seat 14 may support an occupant in the vehicle. The seat 14 includes a seat back 36 and a seat bottom 38 extending transverse to the seat back 36. The seat bottom 38 may be fixed to the vehicle frame and support the occupant from underneath. The occupant may lean back onto the seat back 36. The seat 14 may include a first side 40 and a second side 42. The second side 42 may be disposed opposite the first side 40 about a vertical seat axis A. The vertical seat axis A extends along the seat back 36 toward a top of the vehicle 12.

As shown in FIGS. 2-3, and 6-8, the seat 14 includes the seat airbag 16. The seat airbag 16 is supported by the seat 14. The seat airbag 16 is inflatable from an uninflated position to the inflated position. The seat airbag 16 may be disposed in the first side 40 of the seat 14. The seat airbag 16 may be installed in a seat airbag module 44. The seat airbag module 44 may include an inflator 46 fluidly connected to the seat airbag 16.

Figure 3:
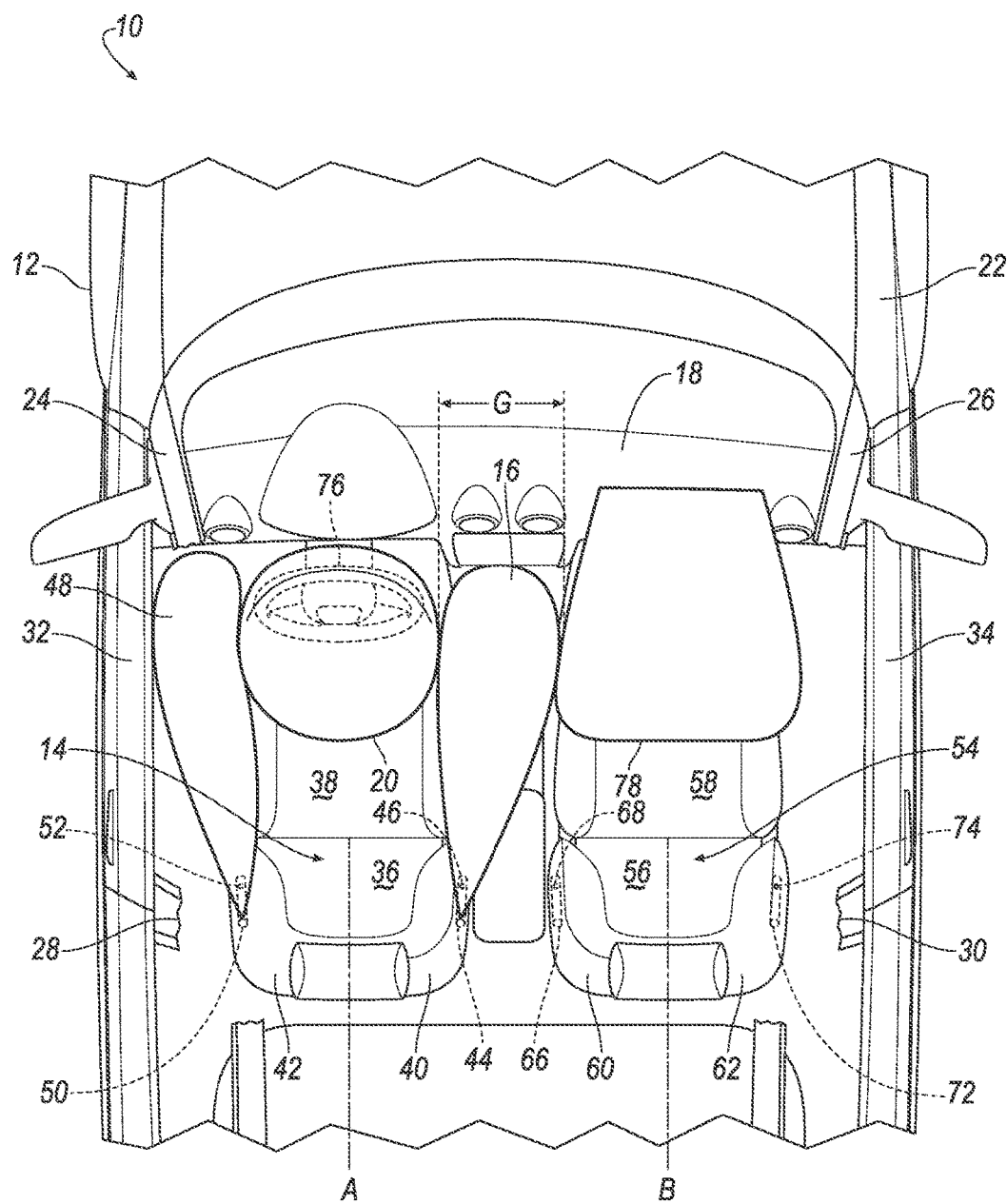
FIG. 3 is a plan view of the vehicle with the seat airbag inflated to the inflated position and a second seat airbag inflated to an inflated position.
Figure 5:
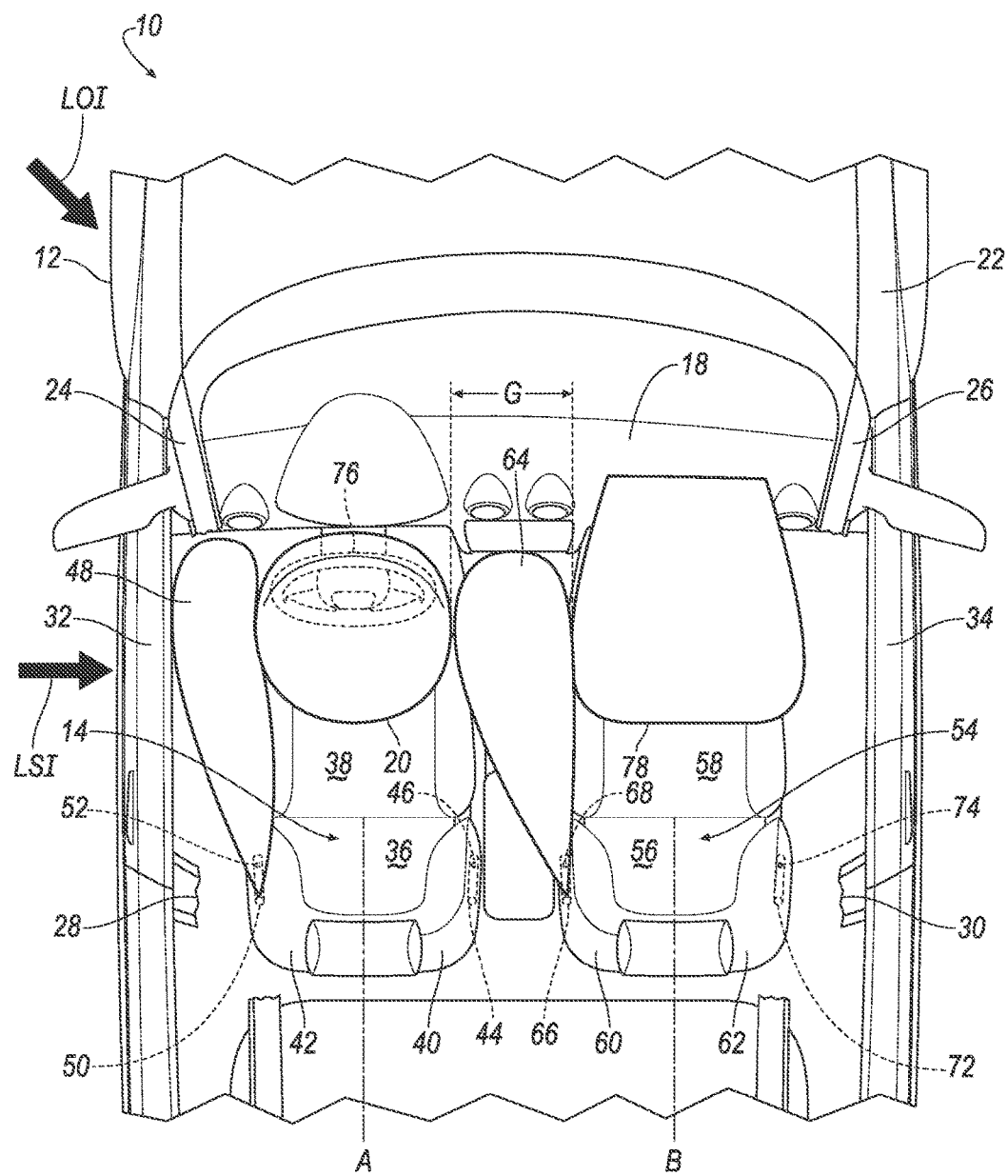
FIG. 5 is a plan view of the vehicle with the seat airbag and the third seat airbag inflated to the respective inflated positions.
Figure 8:
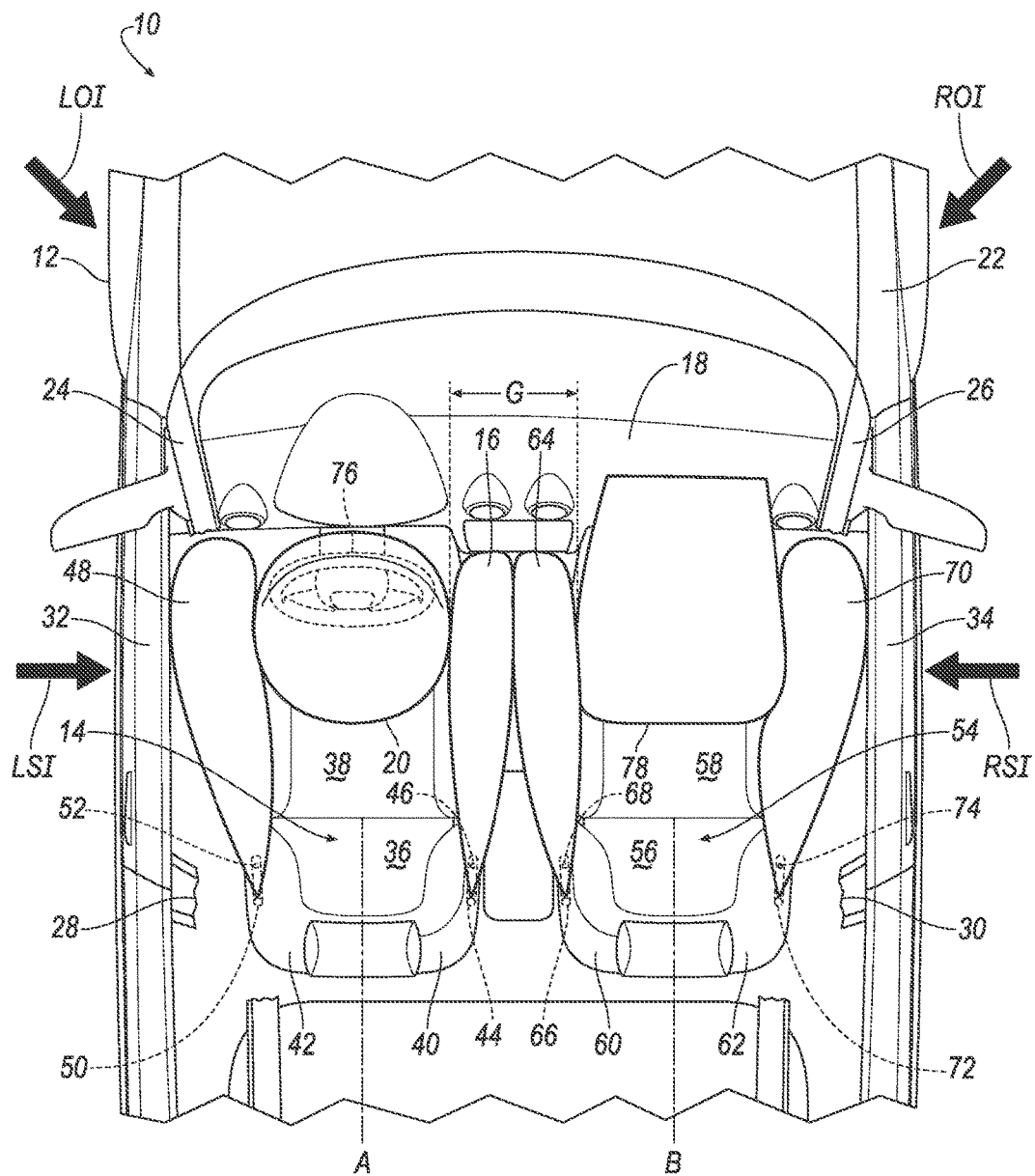
FIG. 8 is a plan view of the vehicle with the seat airbag, the second seat airbag, the third seat airbag, and the fourth seat airbag inflated to the respective inflated positions.

As shown in FIGS. 3, 5, and 8, the seat 14 may include a seat airbag 48. The seat airbag 48 may be supported by the seat 14. The seat airbag 48 may be inflatable from an uninflated position to an inflated position. The seat airbag 48 may be disposed in the second side 42 of the seat 14. The seat airbag 48 may be installed in a seat airbag module 50. The seat airbag module 50 may include an inflator 52 fluidly connected to the seat airbag 48. As another example, a single inflator, i.e., the inflator 46 or the inflator 52, may be fluidly connected to both the seat airbag 16 and the seat airbag 48.

As shown in FIGS. 1-8, the restraint system 10 may include a seat 54. The seat 54 may include a seat back 56 and a seat bottom 58 (not shown in FIG. 1) extending transverse to the seat back 56. The seat 54 may include a first side 60 and a second side 62. The second side 62 may be disposed opposite the first side 60 about a vertical seat axis B. The vertical seat axis B extends along the seat back 56 toward a top of the vehicle 12.

As shown in FIGS. 4-5 and 7-8, the seat 54 may include a seat airbag 64. The seat airbag 64 may be supported by the seat 54. The seat airbag 64 may be inflatable from an uninflated position to an inflated position. The seat airbag 64 may be disposed in the first side 60 of the seat 54. The seat airbag 64 may be installed in a seat airbag module 66. The seat airbag module 66 may include an inflator 68 fluidly connected to the seat airbag 64.

Figure 6:
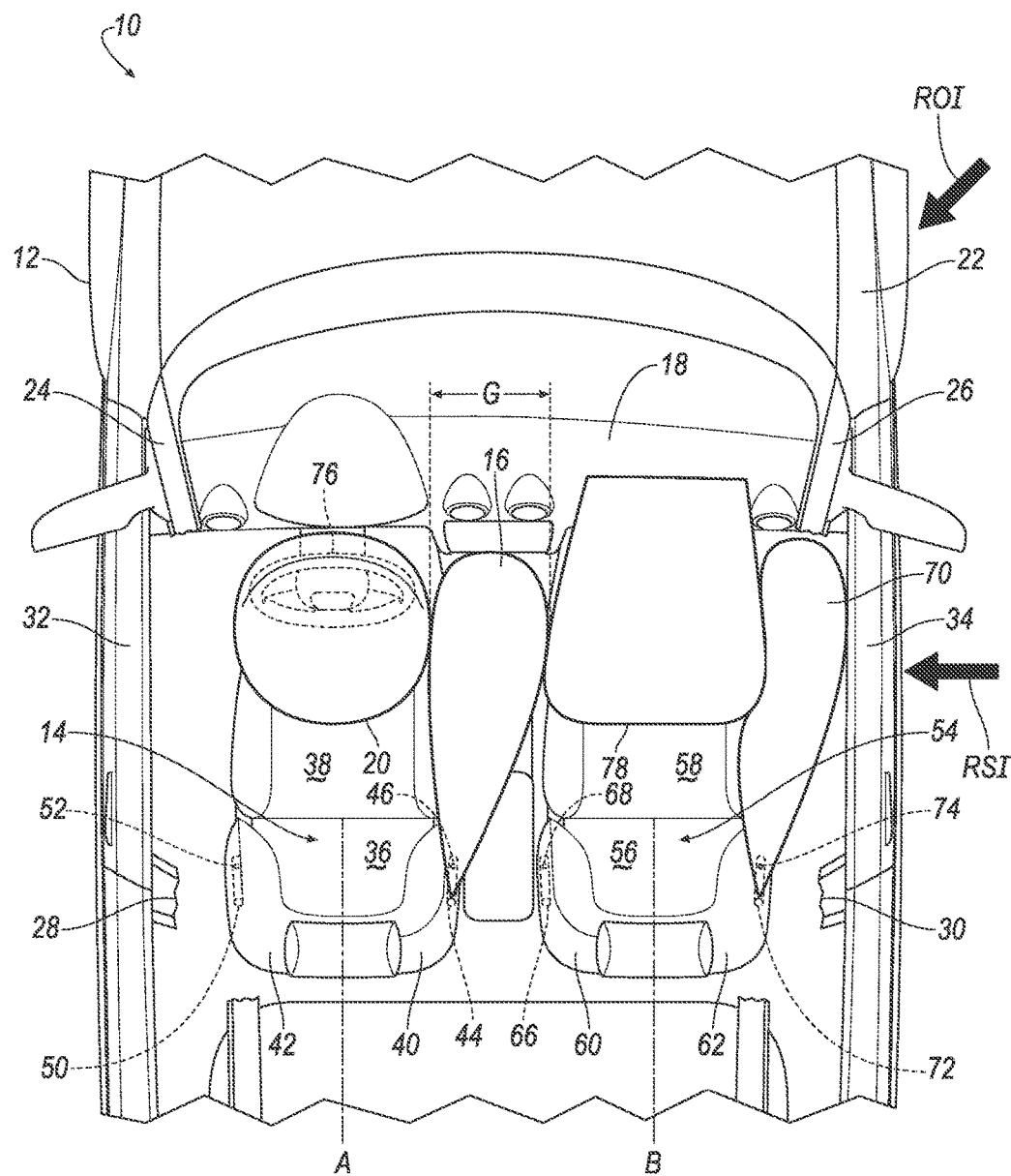
FIG. 6 is a plan view of the vehicle with the second seat airbag inflated to the inflated position and a fourth seat airbag inflated to an inflated position.

As shown in FIGS. 6 and 8, the seat 54 may include a seat airbag 70. The seat airbag 70 may be supported by the seat 54. The seat airbag 70 may be inflatable from an uninflated position to an inflated position. The seat airbag 70 may be disposed in the second side 62 of the seat 54. The seat airbag 70 may be installed in a seat airbag module 72. The seat airbag module 72 may include an inflator 74 fluidly connected to the seat airbag 70. As another example, a single inflator, i.e., the inflator 68 or the inflator 74, may be fluidly connected to both the seat airbag 64 and the seat airbag 70.

Upon receiving a signal from, e.g., the vehicle controller, each inflator 46, 52, 68, 74 may inflate each respective seat airbag 16, 48, 64, 70 with an inflatable medium, such as a gas. Each of the inflators 46, 52, 68, 74 may be, for example, a pyrotechnic inflator that uses a chemical reaction to drive inflation medium to each seat airbag. Each of the inflators 46, 52, 68, 74 may be of any suitable type, for example, a cold-gas inflator.

As shown in FIGS. 1-8, the restraint system 10 includes the instrument panel 18. The instrument panel 18 may be disposed at a forward end of the passenger cabin and face toward the seat 14 and the seat 54. The instrument panel 18 may include vehicle controls, including a steering wheel 76.

As shown in FIGS. 2-8, the restraint system 10 may include the steering wheel 76. The steering wheel 76 may be supported by the instrument panel 18. The steering wheel 76 may be connected to a steering column (not shown) to steer the vehicle 12.

As shown in FIGS. 1-8, the restraint system 10 includes the forward airbag 20. The forward airbag 20 may be supported by the steering wheel 76, i.e., may be a driver airbag. Alternatively, the forward airbag 20 may be supported by the instrument panel 18, i.e., may be a passenger airbag.

As shown in FIGS. 1-8, the restraint system 10 may include a forward airbag 78. The forward airbag 78 may be inflatable from an uninflated position to an inflated position. The forward airbag 78 may be supported by the instrument panel 18. Alternatively, the forward airbag 78 may be supported by the steering wheel 76. The vehicle 12, for example, may not include a steering wheel 76, e.g., in the example where the vehicle 12 is an autonomous vehicle, and both the forward airbag 20 and the forward airbag 78 may be supported by the instrument panel 18.

The forward airbag 20 and the forward airbag 78 are each inflatable from an uninflated position to an inflated position. As shown in FIGS. 1-8, when the forward airbag 20 and the forward airbag 78 are each in the inflated position, the forward airbag 20 and the forward airbag 78 may define a gap G.

Figure 2:
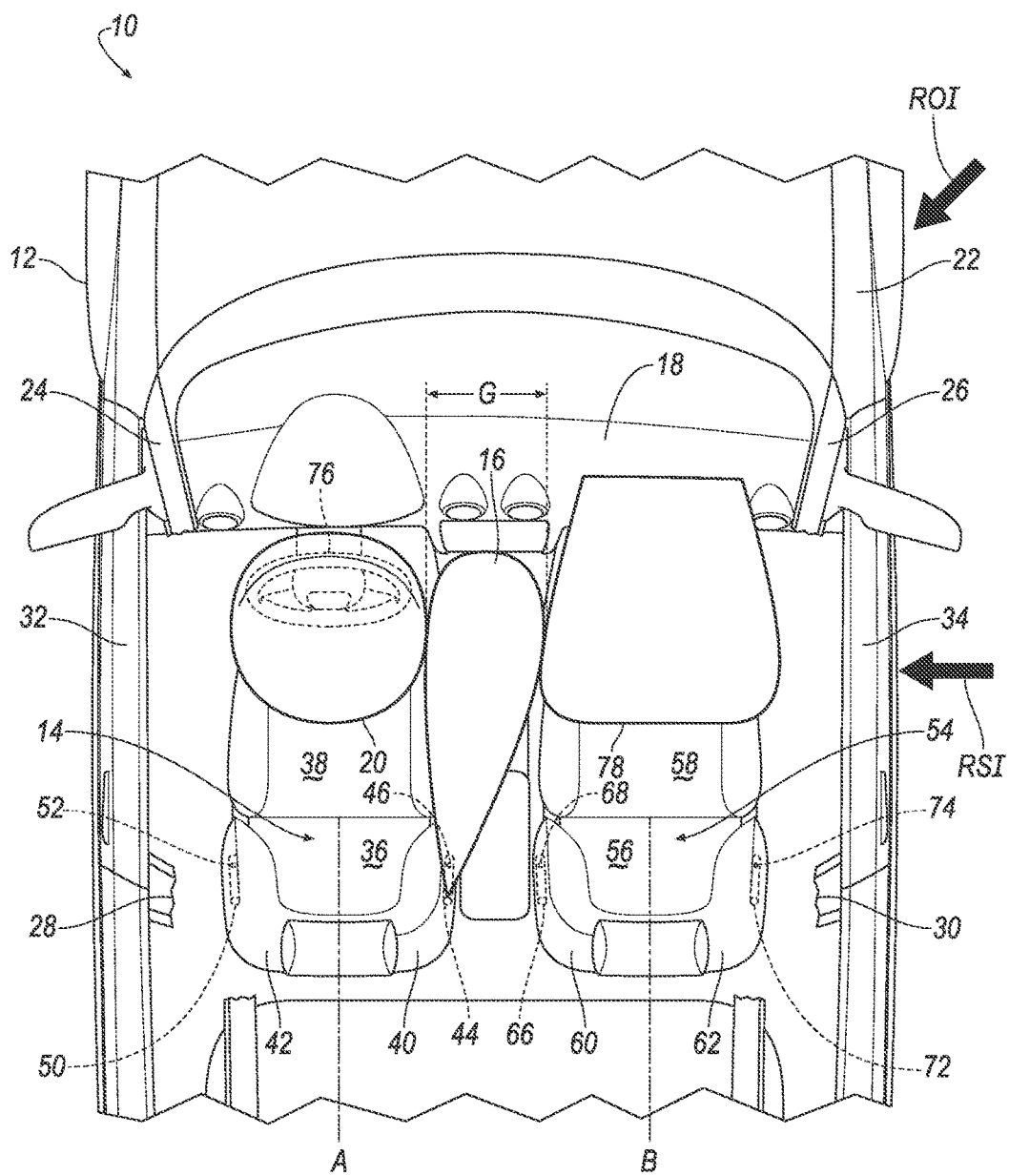
FIG. 2 is a plan view of the vehicle with a seat airbag inflated to an inflated position.
Figure 4:
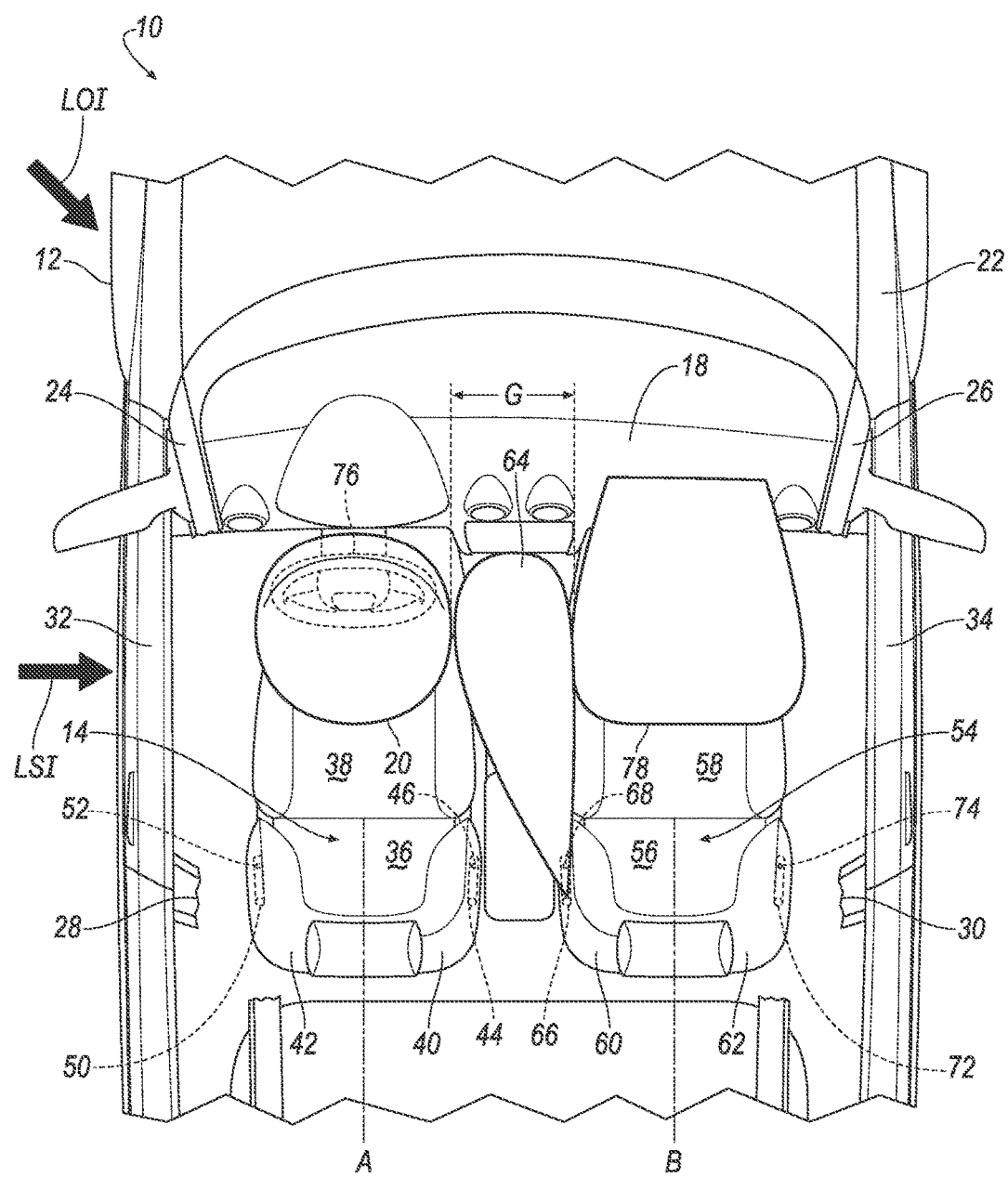
FIG. 4 is a plan view of the vehicle with a third seat airbag inflated to an inflated position.

One of the seat airbags 16, 48, 64, 70 may be inflated to the inflated position, as shown in FIGS. 2 and 4. As shown in FIG. 2, the seat airbag 16 may be the only one of the seat airbags 16, 48, 64, 70 to inflate to the inflated position. For example, when the seat 14 is occupied and the seat 54 is not occupied, the seat airbag 16 may be inflated to the inflated position to absorb energy from the occupant in the seat 14. When the seat airbag 16 is in the inflated position, the seat airbag 16 may be disposed in the gap G. As shown in FIG. 4, the seat airbag 64 may extend from the seat 54 to the forward airbag 20. The seat airbag 64 may be disposed in the gap G when the seat airbag 64 is in the inflated position. When the seat 54 is occupied and the seat 14 is not occupied (e.g., in a driverless autonomous vehicle, in a parked vehicle, etc.), the seat airbag 64 may be inflated to the inflated position to absorb energy from the occupant in the seat 54. Alternatively, any one of the seat airbags 16, 48, 64, 70 may be inflated to the inflated position.

Two of the seat airbags 16, 48, 64, 70 may be inflated to the inflated position, as shown in FIGS. 3 and 5-7. As shown in FIG. 3, the seat airbag 16 and the seat airbag 48 may extend from the seat 14 to the forward airbag 20. The seat airbag 16 may be disposed in the gap G between the forward airbag 20 and the forward airbag 78. The seat airbag 48 may be disposed between the forward airbag 20 and the door 32 when the seat airbag 48 and the forward airbag 20 are each in the inflated position. The seat airbag 48 may be disposed between the forward pillar 24 and the forward airbag 20. The seat airbag 16 and the seat airbag 48 may be inflated during, e.g., a front impact as described below.

Figure 7:
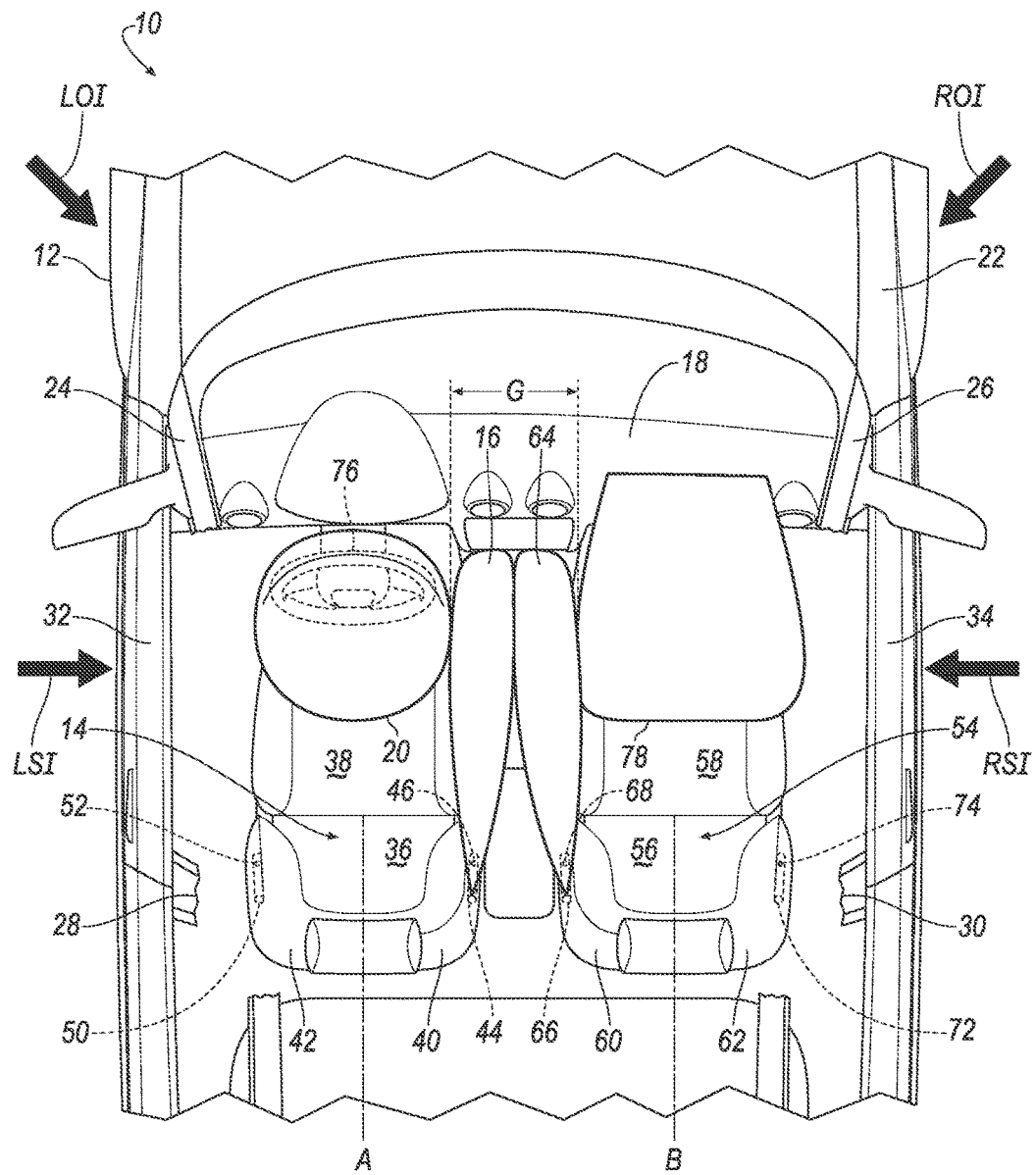
FIG. 7 is a plan view of the vehicle with the second seat airbag and the third seat airbag inflated to the respective inflated positions.

As shown in FIG. 5, the seat airbag 48 may extend from the seat 14 and the seat airbag 64 may extend from the seat 54. The seat airbag 48 may be disposed between the forward airbag 20 and the door 32, and the seat airbag 64 may be disposed in the gap G. The seat airbag 48 and the seat airbag 64 may be inflated during, e.g., a side impact, as described below. As shown in FIG. 6, the seat airbag 16 may extend from the seat 14 and the seat airbag 70 may extend from the seat 54. The seat airbag 16 may be disposed in the gap G. The seat airbag 70 may be disposed between the forward airbag 78 and the second door 34. The seat airbag 16 and the seat airbag 70 may be inflated during, e.g., a side impact, as described below. As shown in FIG. 7, the seat airbag 16 may extend from the seat 14 and the seat airbag 64 may extend from the seat 54. The seat airbag 16 and the seat airbag 64 may be disposed in the gap G. Alternatively, any two of the seat airbags 16, 48, 64, 70 may be inflated to the inflated position.

Three or four of the seat airbags 16, 48, 64, 70 may be inflated to the inflated position, as shown in FIG. 8. As shown in FIG. 8, the seat airbag 16 and the seat airbag 48 may extend from the seat 14, and the seat airbag 64 and the seat airbag 70 may extend from the seat 54. The seat airbag 16 and the seat airbag 64 may be disposed in the gap G. The seat airbag 48 may be disposed between the forward airbag 20 and the door 32. The seat airbag 70 may be disposed between the forward airbag 78 and the second door 34. The seat airbags 16, 48, 64, 70 may be inflated during, e.g., a front impact, as described below. Alternatively, any three or four of the seat airbags 16, 48, 64, 70 may be inflated to the inflated position.

Figure 9:
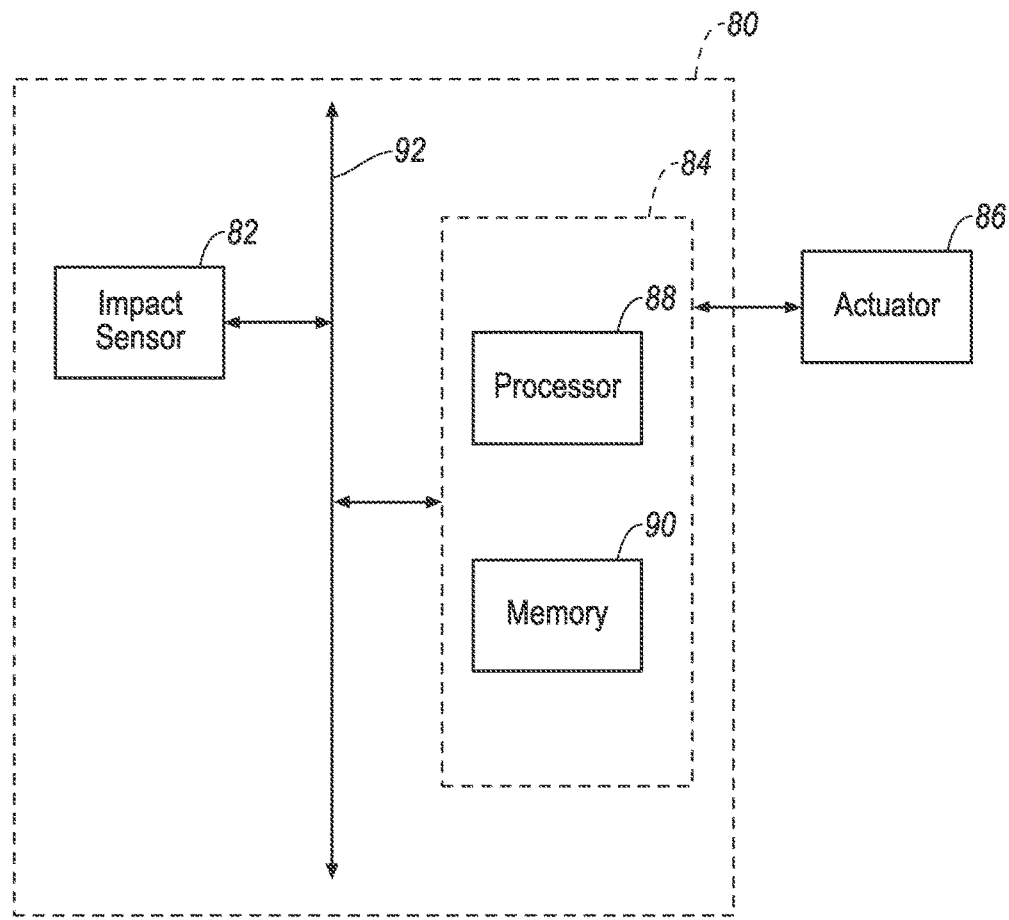
FIG. 9 is a block diagram of an impact sensing system.

With reference to FIG. 9, the vehicle may include an impact sensing system 80. The impact sensing system 80 may include an impact sensor 82 and a controller 84. The controller 84 is in communication with an actuator 86 and may include a processor 88 and a memory 90. The actuator 86 may be programmed to actuate the inflators 46, 52, 68, 74. The memory 90 stores instructions executable by the processor 88 to control the actuator 86. The controller 84 may be programmed to, upon identification of an impact, cause triggering of the actuator 86, causing one or more of the inflators 46, 52, 68, 74 to generate the inflatable medium and deploy the seat airbags 16, 48, 64, 70.

The impact sensor 82 may be in communication with the controller 84. The impact sensor 82 is programmed to detect an impact to the vehicle 12. The impact sensor 82 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 82 may be located at numerous points in or on the vehicle 12.

To facilitate communications, the controller 84, the impact sensor 82, the actuator 86, and other components in the vehicle 12 may be connected to a communication bus 92, such as a controller area network (CAN) bus, of the vehicle 12. The controller 84 may use information from the communication bus 92 to control the triggering of the actuator 86. The actuator 86 may be connected to the controller 84 or may be connected to the communication bus 92.

The controller 84 may be programmed to determine an impact direction based on data collected from the impact sensor 82. The impact sensor 82 may collect data during the impact, e.g., acceleration data, and transmit the data over the communication bus 92 to the controller 84. The controller 84 can, based on the data, identify the impact direction. The impact direction may be, e.g., a left oblique impact (LOI) direction, a right oblique impact (ROI) direction, a left side impact direction (LSI), a right side impact direction (RSI), a front direction, etc. An "oblique" impact describes an impact that occurs at an angle of 10-50 degrees relative to a trajectory of the vehicle 12. As used herein, the terms "left" and "right" describe directions relative to occupants in the seats 14, 54. FIGS. 2 and 4-8 show force arrows indicating the impact directions LOI, ROI, LSI, RSI. FIGS. 4-5 and 7-8 show force arrows indicating the LOI direction. FIGS. 2 and 6-8 show force arrows indicating the ROI direction. FIGS. 4-5 and 7-8 show force arrows indicating the LSI direction. FIGS. 2 and 6-8 show force arrows indicating the RSI direction.

The controller 84 may be programmed to selectively inflate one or more of the seat airbags 16, 48, 64, 70 based on the identified impact direction. As used herein, the term "selectively" means "based on a selection from a group." The controller 84 "selectively" inflates the seat airbags 16, 48, 64, 70 by selecting one or more of the seat airbags 16, 48, 64, 70 and instructing the actuator 86 to inflate only the selected seat airbags 16, 48, 64, 70. For example, the controller 84 may instruct the actuator 86 to actuate the inflator 68 to inflate the seat airbag 64 when the identified impact direction is the LOI direction, as shown in FIG. 4. The controller 84 may instruct the actuator 86 to actuate the inflators 52, 68 to inflate the seat airbags 48, 64, respectively, when the identified impact direction is the LOI direction, as shown in FIG. 5.

The controller 84 may be programmed to selectively inflate one or more of the seat airbags 16, 48, 64, 70 when the identified impact direction is the ROI direction. The controller 84 may instruct the actuator 86 to actuate the inflator 46 to inflate the seat airbag 16 when the identified impact direction is the ROI direction, as shown in FIG. 2. The controller 84 may instruct the actuator 86 to actuate the inflators 46, 74 to inflate the seat airbag 16 and the seat airbag 70, as shown in FIG. 6.

The controller 84 may be programmed to selectively inflate one or more of the seat airbags 16, 48, 64, 70 when the identified impact direction is the front direction. The controller 84 may instruct the actuator 86 to actuate the inflators 46, 52 to inflate the seat airbags 16, 48 when the identified impact direction is the front direction, as shown in FIG. 3. The controller 84 may instruct the actuator 86 to actuate the inflators 46 and 68 to inflate the seat airbag 16 and the seat airbag 64, as shown in FIG. 7. The controller 84 may instruct the actuator 86 to actuate the inflators 46, 52, 68, 74 to inflate the seat airbags 16, 48, 64, 70, as shown in FIG. 8. Alternatively, the controller 84 may be programmed to inflate any one or more of the seat airbags 16, 48, 64, 70 based on the identified impact direction.

The controller 84 may be programmed to instruct the actuator 86 to actuate the inflators 46, 52, 68, 74 to selectively inflate one or more of the seat airbags 16, 48, 64, 70 when the impact sensor 82 detects a side impact. For example, the controller 84 may instruct the inflator 52 to inflate the seat airbag 48 when the impact direction is the LSI direction, as shown in FIG. 5. The controller 84 may instruct the inflator 68 to inflate the seat airbag 64 when the impact direction is the LSI direction, as shown in FIGS. 4 and 5. The controller 84 may instruct the inflator 46 to inflate the seat airbag 16 when the impact direction is the RSI direction, as shown in FIGS. 2 and 6. The controller 84 may instruct the inflator 74 to inflate the seat airbag 70 when the impact direction is the RSI direction, as shown in FIG. 6. Alternatively, the controller 84 may be programmed to inflate any one or more of the seat airbags 16, 48, 64, 70 when the impact sensor 82 detects a side impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system, comprising:
    a seat;
    a seat airbag supported by the seat and inflatable to an inflated position;
    an instrument panel;
    a forward airbag supported by the instrument panel and inflatable to an inflated position; and
    a second forward airbag inflatable to an inflated position, the forward airbag and the second forward airbag defining a gap between the forward airbag and the second forward airbag when the forward airbag and the second forward airbag are each in the inflated position;
    wherein when the seat airbag is in the inflated position and the forward airbags are in the inflated position, the seat airbag extends from the seat to the forward airbag into the gap and in contact with the forward airbag and the second forward airbag.

2. The restraint system of claim 1, further comprising a steering wheel, wherein the second forward airbag is supported by the steering wheel.

3. The restraint system of claim 1, further comprising a vehicle door and a second seat airbag supported by the seat and inflatable to an inflated position, wherein when the second seat airbag and the forward airbag are each in the inflated position, the second seat airbag is disposed between the forward airbag and the vehicle door.

4. The restraint system of claim 3, further comprising an impact sensor programmed to detect a side impact and an actuator programmed to inflate the second seat airbag upon detecting the side impact.

5. The restraint system of claim 1, further comprising an impact sensor programmed to detect an impact direction and an actuator programmed to inflate the seat airbag based on the detected impact direction.

6. The restraint system of claim 1, further comprising a second seat including a second seat airbag supported by the second seat and inflatable to an inflated position, wherein when the seat airbag is in the inflated position and the forward airbag is in the inflated position, the second airbag extends from the second seat to the forward airbag.

7. A restraint system, comprising:
an impact sensor programmed to detect an impact direction;
a seat;
a first airbag supported by the seat and inflatable to an inflated position;
a second airbag supported by the seat and inflatable to an inflated position;
a forward airbag inflatable to an inflated position;
a second forward airbag inflatable to an inflated position; and
an actuator in communication with the first airbag and the second airbag;
wherein, based on the impact direction, the actuator is programmed to selectively inflate one of the first airbag and the second airbag to extend from the seat to the forward airbag in the inflated position in contact with the forward airbag and the second forward airbag.

8. The restraint system of claim 7, wherein the seat includes a first side and an opposing second side, the first airbag being disposed in the first side and the second airbag being disposed in the second side.

9. The restraint system of claim 7, further comprising an impact sensor programmed to detect a side impact.

10. The restraint system of claim 9, wherein, upon detecting the side impact, the actuator is programmed to actuate one of the first airbag and the second airbag.

11. The restraint system of claim 7, wherein the impact direction is one of a left oblique impact direction and a right oblique impact direction, and the actuator is programmed to inflate the first airbag when the impact direction is the left oblique impact direction and to inflate the second airbag when the impact direction is the right oblique impact direction.

12. The restraint system of claim 7, further comprising a second seat including a third airbag supported by the second seat inflatable to an inflated position and a fourth airbag supported by the second seat inflatable to an inflated position, wherein, based on the impact direction, the actuator is programmed to inflate one of the third airbag and the fourth airbag.

13. The restraint system of claim 12, wherein the impact direction is one of a left oblique impact direction and a right oblique impact direction, and the actuator is programmed to inflate one of the first airbag and the second airbag and one of the third airbag and the fourth airbag when the impact direction is the left oblique impact direction and to inflate the other of the first airbag and the second airbag and the other of the third airbag and the fourth airbag when the impact direction is the right oblique impact direction.

14. A vehicle, comprising:
a pillar;
an instrument panel;
a steering wheel;
a seat;
a forward airbag supported by the instrument panel and inflatable to an inflated position;
a second forward airbag supported by the steering wheel and inflatable to an inflated position, the forward airbag and the second forward airbag defining a gap between the forward airbag and the second forward airbag when the forward airbag and the second forward airbag are each in the inflated position;
a first seat airbag supported by the seat and inflatable to an inflated position; and
a second seat airbag supported by the seat and inflatable to an inflated position;
wherein when the forward airbag, the second forward airbag, and the first seat airbag are each in the inflated position, the first seat airbag extends from the seat to the forward airbag into the gap and in contact with the forward airbag and the second forward airbag; and
when the forward airbag and the second seat airbag are each in the inflated position, the second seat airbag is disposed between the forward airbag and the pillar.

15. The vehicle of claim 14, further comprising an actuator programmed to inflate the first seat airbag and the second seat airbag.

16. The vehicle of claim 15, further comprising an impact sensor programmed to detect an impact direction, wherein the actuator is further programmed to inflate one of the first seat airbag and the second seat airbag and to prevent inflation of the other of the first seat airbag and the second seat airbag based on the detected impact direction.

17. The vehicle of claim 14, further comprising:
a second pillar;
a second seat;
a third seat airbag inflatable to an inflated position supported by the second seat; and
a fourth seat airbag inflatable to an inflated position supported by the second seat;
wherein when the second forward airbag and the third seat airbag are each in the inflated position, the third seat airbag extends from the second seat to the second forward airbag into the gap and in contact with the second forward airbag; and
when the second forward airbag and the fourth seat airbag are each in the inflated position, the fourth seat airbag is disposed between the second forward airbag and the second pillar.

18. The vehicle of claim 17, further comprising an impact sensor programmed to detect an impact direction, and an actuator programmed to inflate at least one of the first seat airbag, the second seat airbag, the third seat airbag, and the fourth seat airbag based on the detected impact direction.

19. The vehicle of claim 18, wherein the impact direction is one of a left oblique impact direction and a right oblique impact direction, and wherein the actuator is further programmed to inflate the first seat airbag and the fourth seat airbag when the detected impact direction is the left oblique impact direction.

20. The vehicle of claim 18, wherein the impact direction is one of a left oblique impact direction and a right oblique impact direction, and wherein the actuator is further programmed to inflate the second seat airbag and the third seat airbag when the detected impact direction is the right oblique impact direction.

* * * * *